July 10, 1962  L. W. ERATH  3,044,014
METHOD AND APPARATUS FOR COMPOSITING SEISMIC RECORDS
Filed May 31, 1957  2 Sheets-Sheet 2
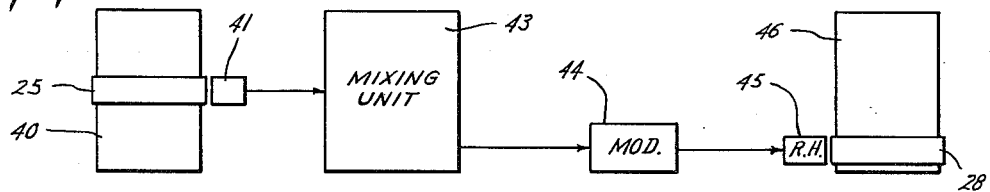
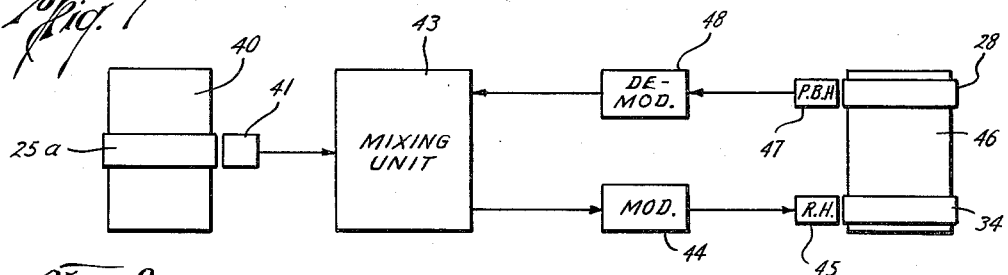
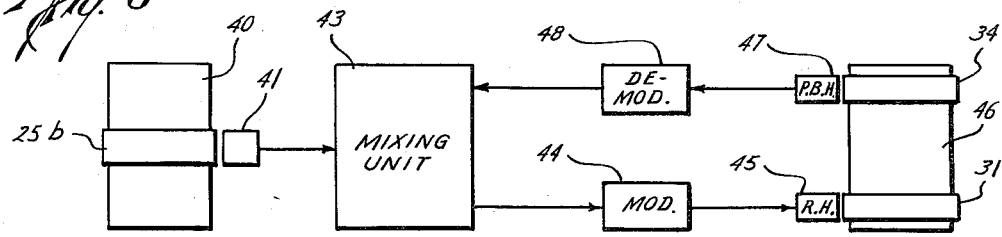
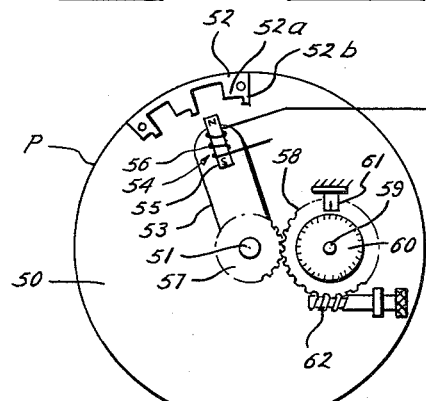
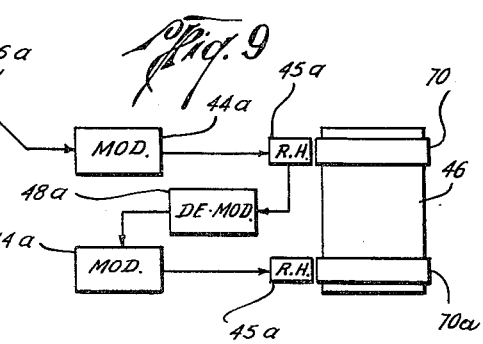
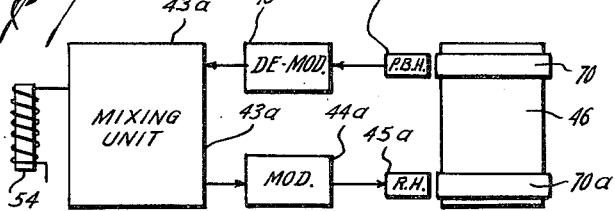
Louis W. Erath
INVENTOR.
BY Arnold and Stidham
ATTORNEYS

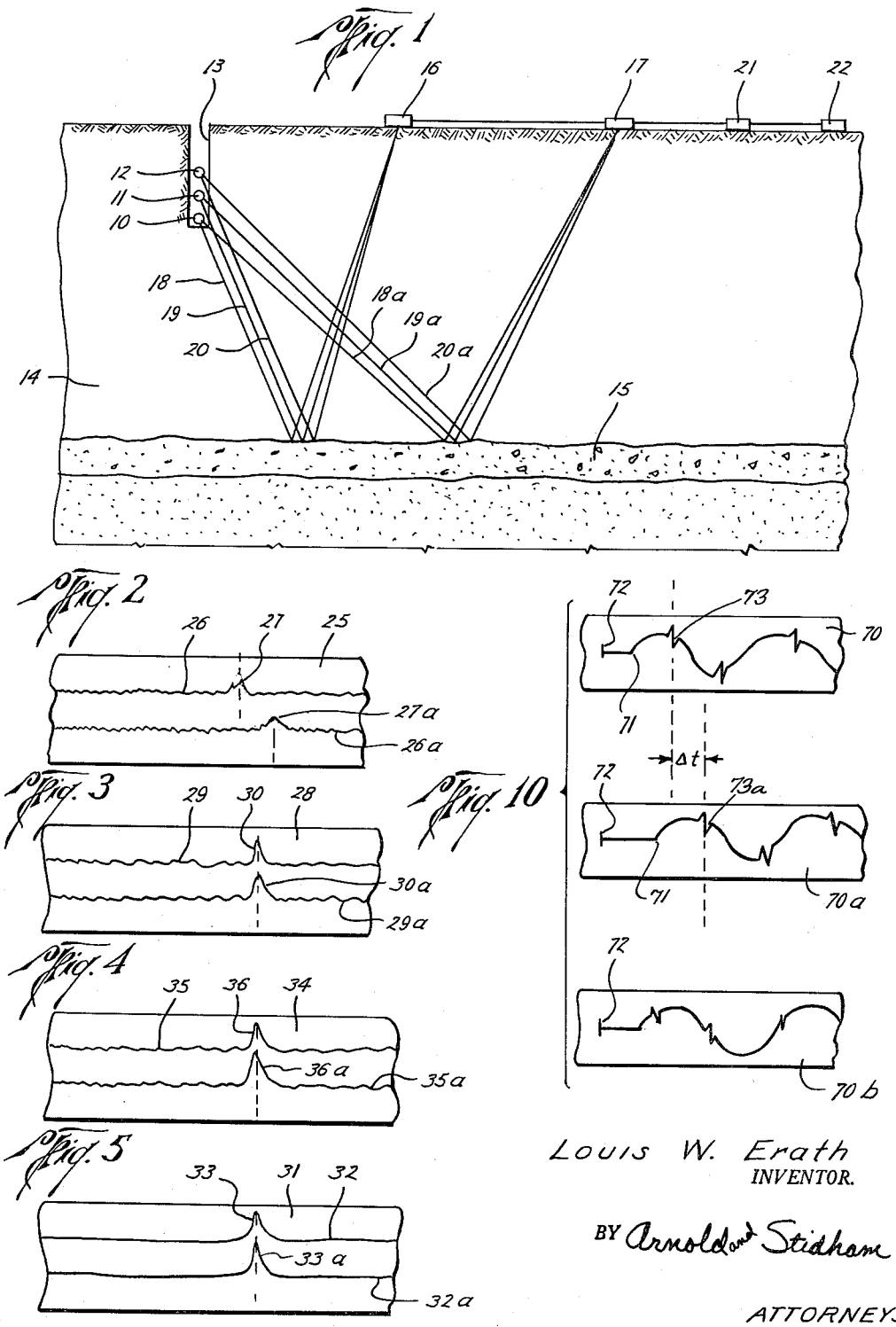

United States Patent Office 3,044,014
Patented July 10, 1962

3,044,014
METHOD AND APPARATUS FOR COMPOSITING SEISMIC RECORDS
Louis W. Erath, Houston, Tex., assignor, by mesne assignments, to Dresser Industries, Inc., Dallas, Tex., a corporation of Delaware
Filed May 31, 1957, Ser. No. 662,882
8 Claims. (Cl. 324—77)

My invention relates to a method and apparatus for compositing seismic records and, more particularly, to a method and apparatus for checking and insuring the proper alignment of successive seismic recording traces.

Seismic exploration involves the generation of vibration waves in the earth by shock or otherwise, components of such vibration waves being reflected back to the surface from various sub-surface strata to be translated into electrical signals by geophones. These significant signals are recorded on a constant velocity medium wherein length is representative of time-of-travel and hence, the depths of the various strata when the velocity of the vibration waves in the earth is known. Interpretation of seismic records so produced is hampered by the occurrence of recorded signals caused by extraneous, undesirable components of noise, which signals frequently cannot be distinguished from the significant signals. It was, therefore, determined that if the recordings of signals resulting from a series of vibration wave generations were integrated into a single composite record, the significant signals on all records would be in phase and would, therefore, be added on the composite record at a faster rate than random extraneous components of noise.

A preferred method of producing composite records is described in the co-pending application of Louis W. Erath and Paul E. Madeley, Serial No. 578,118, which issued into Patent 2,902,107 on September 1, 1959. That method involves the firing of a series of shots; modulating and recording signals produced thereby; demodulating those signals; mixing them with signals produced by the second shot; modulating and recording the composite signals; playing back and demodulating the first composite signals so recorded; mixing them with signals from a third shot; and so forth, until all the significant events occurring in phase are added sufficiently to be distinguishable.

Since each re-recorded signal is fed through a demodulator the electronics system of a demodulator which includes electronic filters, a delay inherent in the electronics system is introduced therein so that the instant of its re-recordation is subsequent to the recordation of an initially received signal. If the phase shift of the re-recorded signal is not linear and the wave forms of the signals are not proportional, this time delay, through infinitesimal, is often sufficient to prevent true integration of records, particularly when the compositing is accomplished by sequential mixing of signals with the delay being additive throughout the composition.

It is, therefore, an object of this invention to produce an apparatus by means of which delays imposed upon an electrical signal can be determined and proper composition of a sequence of such signals assured.

It is a further object of this invention to provide a method for compensating for delays in the recordation of signals for purposes of compositing a plurality of repetitious signals into a single seismic record.

Other objects and novel features of the invention will become apparent from the following specifications when viewed in connection with the accompanying drawings wherein:

FIG. 1 is a schematic diagram illustrating the manner in which a seismic field record is made and showing the receiver geophones spaced at varying distance from the detonated charges;

FIG. 2 is a partial view of a field seismic record illustrating the repetitious signals and random components of noise in the original traces;

FIG. 3 is a partial view of a corrected seismic record;

FIGS. 4 and 5 are partial views of composite corrected seismic records;

FIGS. 6, 7 and 8 are schematic views of the method of compositing in which my invention is employed;

FIG. 9 is an elevation partially in schematic view of apparatus constructed in accordance with the invention;

FIG. 10 illustrates partial views of recordings of a transient signal produced in accordance with my invention; and FIG. 11 is a partial schematic view of the method of testing for proper composition in accordance with my invention.

Referring first to FIG. 1 there is a schematic diagram illustrating the method of seismic survey including the generation of seismic waves as by detonating suitable charges or shots 10, 11 and 12 within a shothole 13. The detonation of each shot generates seismic waves which traverse the sub-surface formations 14, components thereof being reflected upwardly from various strata 15 to geophones located at the surface, two geophones 16 and 17 being shown here by way of illustration. For example, if a seismic wave is generated by a shock at 10, components 18 and 18a travel downwardly through the sub-surface composition 14 as shown and are reflected upwardly from the upper surface of a strata 15 to geophones 16 and 17. Similarly, components 19 and 19a are generated by a shock at 11 and components 20 and 20a are generated by a shock at 12. The components so generated at each shock are reflected and received at geophones 16 and 17. The geophones upon receiving the reflected wave components generate energy impulses which are amplified at 21 and transmitted to a field recorder 22 which records the arrival of the reflected components or significant events in the form of an amplitude change in the trace.

A record produced by recorder 22 is usually in the form of a tape 25 as partially illustrated in FIG. 2, and having traces 26 and 26a thereon. Because no compensation has been made for variation in time-of-travel of the wave components caused by the difference in spacing of geophones 16 and 17 from the shothole, the "kick" or excursions 27 and 27a indicating energy impulses transmitted from geophones 16 and 17 are not aligned although the strata 15 is horizontal. When corrections for depth of shot point, geophone spacing, etc. are introduced to produce a corrected record 28 with the length of the traces 29 and 29a being representative of the time-of-travel of seismic wave vertically from the earth's surface to strata 15 and return, the "kicks" 30 and 30a will indicate important information relative to the disposition and depth of sub-surface strata. Consequently, it is extremely important that excursions in the record traces caused by significant events be readily distinguishable from those caused by extraneous noise, vibration and undesirable horizontally travelling seismic wave components. Frequently, however, the amplitude of the significant signals is insufficient to support positive identification and excursions caused by random noise may incorrectly suggest a significant geological characteristic.

The records produced by the second and third shots, if corrected and recorded independently, would appear similar to corrected record 28. If all of the seismic records so produced were played back and recorded on a single tape, a record 31 (FIG. 5) having composited traces 32, 32a (for geophones 16 and 17, for example) with cumulative excursions 33, 33a could be produced. The repetitious significant events shown independently at 27, 27a on record 25 (FIG. 2) all occur in phase and are therefore additive while the random noises occurring out of phase cannot add as fast. Consequently, the cumulative significant events 33, 33a in FIG. 5 are readily distinguishable from random responses for interpretation by a geophysicist.

However, I prefer to accomplish the composition of seismic records by mixing and building up a succession of corresponding significant signals from a sequence of field records. By this method an intermediate sequence of composited records, such as record 34 (FIG. 4) are achieved. Thus, the traces 35, 35a (one from each of two geophones) are composited with similar traces from the same geophones upon subsequent shots to cancel partially the random noises while adding significant events 36, 36a until a desired readable record 31 of FIG. 5 is produced. The system of progressive compositing is described in the Schempf Patent 2,806,545 and Erath and Madeley Patent 2,902,107. An embodiment of such progressive compositing is illustrated generally in FIGS. 6, 7 and 8 wherein an uncorrected field record 25, having traces (not shown) thereon for each of a number of geophones, is mounted on a recorder drum 40 and is played back by a bank of playback heads at 41 and corrections for geophone spacing, depth of shot, etc. introduced by any suitable means or method, as by angular displacement of the playback head 41. The corrected signals are fed through a mixing unit 43, modulated at 44 and recorded by a bank of recorder heads 45 to produce a corrected seismic record 28 on drum 46, the record 28 having a trace or channel for each geophone used in making the field record.

While two drums 40 and 46 may be used, and the rotation of one may be correlated with the rotation and position of the other, it is also apparent that a single drum with facility for the several records appropriately mounted thereon may be used.

After the corrected record 28 is produced, a second field record 25a is placed on drum 40, played back, corrected and fed to mixing unit 43. Simultaneously, the first corrected record is played back by a bank of playback heads 47, demodulated at 48 and also fed to the mixing unit 43. There the playback signals from records 25a and 28 are mixed and transmitted together to a frequency modulator and then to the bank of recording heads 45 which impress an intermediate composite record 34. Finally, after this compositing sequence is carried through a desired number of stages, an intermediate composited record is played back, demodulated, and fed to the mixing unit 43 where it is mixed with the corrected signals from another field record 25b, the mixed signals being modulated and recorded on final composite record 31, the repetitious events arriving in phase alignment to be added together. Thus, an integrated seismic record 31, FIGS. 5 and 8, is produced wherein the significant events 33, 33a (FIG. 5) are readily distinguishable.

It is apparent from the above that the initial set of signals generated by seismic wave components 18 and 18a and recorded on corrected record 28, FIG. 3, has passed through the electronic system of the demodulator twice before the third record is composited. Similarly, the second set of signals from seismic wave components 19 and 19a has passed through the electronic system, and particularly through the filter of the demodulator, it is delayed a small period of time sufficient to prevent the exact compositing of successive signals. This time delay being additive, a signal passing through the demodulator a number of times may be out of phase with later signals mixed therewith by an amount sufficient to distort the record. Compensation for a mere time delay can be effected but it must be ascertained that the phase shift of the recorded signal produced by such time delay is linear with respect to the frequency of the signal components so that the shape of wave forms produced by a composite of several frequencies, as is the nature of signals generated by seismic impulses, will not be distorted. My invention is directed to an apparatus and method by means of which this electronic delay may be measured at any time and proper composition of successive seismic records assured.

Referring now to FIG. 9, I have shown a drum or disc 50 driven on shaft 51 by means (not shown) at a constant velocity so that each degree of rotation can be translated into a particular increment of time. For this purpose one of the record carriers, such as drums 40 or 46 employed in the aforedescribed seismic record compositing system of FIGS. 6, 7 and 8 may be employed as the test drum or disc 50. As a preferred embodiment of my invention, I secure to a circular end of the drum 50 at a fixed position relative to a fixed reference point P on the drum a plate segment 52 of a material that is magnetically permeable. Mounted for limited pivotal movement about shaft 51 of the drum is an arm 53 carrying at the outer end thereof a reluctance pickup 54 comprising a permanent magnet 55, surrounded by a coil 56. Secured to the arm 53 for pivoted movement thereof is a gear 57 engageable by pinion 58 carried on stub-shaft 59. Also keyed to stub-shaft 59 is an index wheel 60 having an index scale thereon associated with an index pointer 61. Engaging the pinion 58 is a worm 62 by means of which the pinion 58 can be rotated a measured amount in accordance with index scale to pivot the arm 53 through an arc concentric with the surface of drum 50. During each revolution of drum 50 the plate segment 52 passes adjacent to reluctance pickup 54 to induce a signal in the coil 56 which is modulated at 44a and fed to a recording head 45a which records a deviation in the trace being impressed on the record 70 carried on drum 46.

Preferably the plate segment 52 is designed to produce a composite signal of more than one frequency. For example, the plate illustrated has elements 52a and 52b designed to produce a composite wave form such as is shown generally on record 70 in FIG. 10 with the excursion caused by the low frequency component of the transient signal beginning at a point 71 occurring after a fixed reference point 72 representative of point P on the drum, and the excursion 73 of a high frequency transient signal occurring at a predetermined phase of the low frequency cycle.

Since both drums 50 and 46 rotate at fixed constant speeds, a measured length of the trace recorded on the record 70 will represent a certain period of time which is, in turn, represented by a certain distance along the periphery of drum 50. Since any fixed point on the drum, such as reference point P is in precisely the same position at any given stage of each rotation of drum 50, it can be represented on the record 70 (FIGS. 9 and 10) by a signal at a fixed point on the trace, or simply by the beginning of the recorded trace. However, the precise stage of the rotation of drum 50 at which a signal is induced in conductor 56a by the plate segment 52 is dependent upon the angular disposition of the pick up 54 and, for that reason, the occurrence of signal characteristics 71, 73 relative to reference point 72 may be varied.

The time-of-travel of the induced signal is unaffected by factors influencing seismic signals such as surface conditions, spacing from shot point, etc., and the location of point 71 with respect to reference point 72 is dependent solely upon the relative positions of the plate segment 52, or the fixed reference point P, and the reluctance pickup 54. Moreover, the recording of this signal is not confused by extraneous undesired signals and the components thereof can be distinguished positively.

If the record trace on record 70 of FIG. 9 and FIG. 10 is then played back and fed through the demodulator 48a of the exact type employed in the seismic recording system, again modulated at 44a and recorded at 45a, the record 70a of FIGS. 9 and 10 should be produced with the phase shift of the wave components being linear with respect to frequency and the wave of record 70a (FIG. 10) assuming the same form as that of record 70. If however, the phase shift produced by the compositing system demodulators 48, or by identical test demodulators 48a were non-linear with respect to frequency, the wave might be distorted as in 70b (FIG. 10) and proper compositing of repetitive signals would be precluded. My transient signal generator thus affords a check on the electronic system, and particularly the demodulators 48 used in the seismic compositing system to insure that it functions to pass wave forms of repetitive signals proportionally whereby corresponding wave form components merely occur at a later time on playback relative to the reference point 72 than was the case on original recording.

Since the drum 46 on which the seismic records and transient signal test records are impressed rotates at a constant velocity, the amount of misalignment between corresponding phases 71, 71a and 73, 73a of the transient signals as originally recorded and as picked up, demodulated and re-recorded, will be representative of the time delay $\Delta t$ (FIG. 10) caused by passage of a signal through the electronics of the demodulator. The index scale 60 representing time increments can then be rotated by worm 62 an amount indicated by the time delay $\Delta t$ to move arm 53 and hence inductance pickup 54 away from reference point P in a direction to delay the induction of a subsequent transient signal an amount sufficient to bring it in phase coincidence with the playback signals. When these successive signals are in perfect phase alignment, by reason of retarding the position of the reluctance pickup 54 relative to the plate segment 52, a playback of the first transient signal can be mixed with a subsequent transient signal at the mixer 43 of the system shown in FIGS. 6, 7 and 8 or one identical thereto 43a of FIG. 11, to modulate and record a composite signal at 45 and produce a record of the nature of record 70a of FIG. 10 wherein all wave components 71, 71a and 73, 73a are in coincidence and are properly added.

When proper alignment and composition of the transient signals are achieved, alignment and composition of the seismic signals can likewise be attained by introduction of the same time delay $\Delta t$ compensation as is indicated on index scale 60. That is, if the reluctance pick up 54 must be pivoted through a particular arc in order to achieve precise compensation for electronic delay, the playback heads 41 in the seismic system should be adjusted to compensate for the time represented on the scale 60, as by moving them over the surface of drum 40 through an arc of concomitant angular extent. Thus, the operator may periodically check for proper compensation of the known transient test signals in order to determine that accurate and proper compensation for electronics delay is being made in the composition of the actual seismic records. This method assures proper compositing of actual seismic signals having various frequency components and which are subjected to the same electronics time delay in an identical system.

Since the electronics delay will be introduced each time a signal is demodulated, it is apparent that a third transient signal will have to be delayed a period of time equal to twice the electronics delay in order to mix it for proper compositing with the first composite transient record playback, the fourth record three times the electronics delay and so forth. This conforms with the compensation necessary to be effected during compositing of the actual seismic records in addition to other corrections previously mentioned when compositing in the manner hereinbefore described, and affords a constant check on the system.

Though not necessary to the practice of the method of this invention, in some practice it may be convenient for the disc or drum 50 to be carried on the end of the field record playback drum 40 to rotate therewith, and the pickup heads 41 may be mounted upon or otherwise operatively connected to the arm 53 for movement to advanced or retarded positions by corresponding movement of the arm 53. Thus, the seismic field record pickup heads may be automatically moved arcuately through the precise angular displacement which is indicated on index 60 (when the trace on record 70 has been brought into perfect alignment with the trace on record 70a of FIGURE 9) as necessary to effect electronic time delay compensation.

An obvious alternative is to couple the arm 53's movements to one of the two drums in those systems using two separate drums as illustrated in FIGURES 6–8, such that the angular position of the drum 46, for example, relative to that of drum 40 and disc 50, is modified in proportion to the movement of the arm 53. However, applicant has found the manual setting by the operator, of the alignment of the drum 46 with respect to the heads working in cooperation therewith, to be satisfactory without automatic connection and operation.

The test recording and playback heads 45a and 47a may operate on separate channels of the compositing record drum so that a check of the electronic system is is continuously available to the operator. It is also apparent that the transient signals induced in coil 56 may be transmitted through the system that is actually being used in seismic composition, but since a given time delay is characteristic of a particular electronic system, use of a specimen electronic system gives satisfactory results.

The clearest understanding of actual practice in determining $\Delta t$ is founded upon the realization that the records commonly used in field geophysical work are of an oscillographic type, wherein each signal is traced and indicated visibly upon a tape having lines scribed thereon for each of some short unit of time, such as ten milliseconds. With that thought in mind a reveiw again of the test procedure may aid understanding.

First a signal such as that on record 70 in FIGURE 10, is derived from the test signal generator 52—54, just as a first geophysical signal may be derived from a first shot. That first test signal is recorded upon record 70 of FIGURE 9; it is then picked up, demodulated, remodulated and re-recorded on record 70a of FIGURE 9 and looks like the trace of record 70a of FIGURE 10, i.e., the signal is late by $\Delta t$. Since both traces are visible and are on tape having timing lines scribed thereon, it is easy to read from the two records, the time $\Delta t$.

If such time lines or equivalent scales are available (they almost always are), the arm 53 is moved an amount read on the scale 61 to be equal to $\Delta t$ as read from the timing lines or scale. If no such timing lines or equivalent scales are available, the misalignment of the signals on records 70 and 70a may be estimated and the arm 53 moved an amount read on the scale 60 to be equal to $\Delta t$. In either event a new recording of a test signal on a new record placed in the position of record 70 in FIGURE 9 is made, and that new recording is then compared with the previously made record 70a to determine whether perfect alignment has been effected. If so, then $\Delta t$ has been reduced to zero insofar as it appears upon the two records then on the drum 46, and the amount of $\Delta t$ may be read off the scale 60 as the amount arm 53 has been moved in order to bring the new record 70 into alignment with the record 70a. $\Delta t$ represents the time required for the signal of record 70a of FIGURE 9 to have passed through a demodulation and a modulation to which the signal of record 70 has not been subjected.

With the time $\Delta t$ thus determined, a final check on the actual circuit used in compositing is conveniently made, as indicated in FIGURE 11, thusly:

A test signal (analogous to a first shot signal from a geophone) is derived from the pick up 54, passed through the mixing unit 43a, modulator 44a, and recording head 45a and recorded on the lower of the two records in FIGURE 11, the signal being passed through the selfsame electronic circuits as those about to be used to composite geophysical shots.

The record so obtained is then moved to the upper position opposite a playback head 47a in FIGURE 11, and as the original recording it is of the form of record 70 in FIGURE 10 and is thus identified now as record 70 in FIGURE 11.

Then, the signal on record 70 is played back (analogous to the first shot being played back) and fed into the mixer, and at the same time a new signal (analogous to the second shot) of the same identical form as the first since both come from the same signal generator, is derived from the pick up 54 and fed to the mixer. By the delay of one or advance of the other signal an amount Δt the two identical signals are supposed to arrive exactly in phase and add perfectly. Whether they do this is easily observed on the oscillographic type record of the composite of the two on record 70a of FIGURE 11. If the addition is perfect the geophysical work gets underway using real shot signals instead of test signals. If they have not added perfectly, a further refinement in the determination of or adjustment for Δt is made, and repeated, until perfect compositing of the test signal is obtained. Only then is actual geophysical signal composition commenced.

I do not wish to be limited by the particular type or design of the means shown for producing the necessary transient signal. If desired, a switch may be actuated by some element associated with the drum to transmit a transient signal by electronic or other means. The important factors are that the generation of the transient signal must be in synchronism with a fixed position on the record drum and it must deviate from that position by a known amount. That is, whether I employ the plate segment 52 and reluctance pickup 54 as shown, or a switch and switch-actuating cam or the like, one element is fixed to the record drum or rotated in synchronism therewith so that the operative association of the two elements occurs at a predetermined point on the record medium. This predetermined point can be adjusted relative to a fixed point on the drum by moving the two elements relative to each other to advance or retard their point of operative association. In the embodiment illustrated, this adjustment is accomplished by pivoting the arm 53 to move one element, the reluctance pickup 54, relative to the other element, the plate segment 52 to advance or retard the instant of transient signal generation relative to a fixed point P on the drum.

It will be appreciated that the specific method of testing for proper composition of repetitive electrical signals generated by seismic waves and the particular apparatus described for generating transient electrical signals for this purpose has been described in great detail merely to facilitate the use by those skilled in the art of the present invention, and that many modifications and variations may be made therein within the spirit and scope of my invention as defined by the appended claims.

Having described my invention, I claim:

1. A method of testing for proper composition of two repetitive electrical signals of undetermined characteristics wherein one of said signals has a time delay imposed thereon by an electronic system, said method comprising the steps of initiating an operating cycle of a recording device, said recording device including a recorder and a record medium moving during said operating cycle at constant relative velocity whereby a longitudinal trace representative of time is impressed on said record medium, generating at a fixed time in said operating cycle a transient electrical signal of known characteristics, feeding said transient electrical signal to said recorder whereby an excursion in said trace representative of said transient signal is recorded, initiating a second operating cycle of said recording device, detecting said trace and transducing said excursion into a playback electrical signal, passing said playback signal through said electronic system, generating at a predetermined time in said operating cycle a second transient signal of said known characteristics, said predetermined time occurring later than said fixed time by the length of said time delay, mixing said playback signal and said second transient signal to form a composite signal, and feeding said composite signal to said recorder.

2. A method for testing for proper composition of two repetitive electrical signals of unknown characteristics wherein one of said signals has a time delay imposed thereon by an electronic system, said method comprising the steps of initiating an operating cycle of a recording device, said recording device including a record medium moving during said operating cycle at a constant velocity and a recorder operatively associated therewith to impress thereon a record trace the length of which is representative of time, generating a first transient electrical signal of known characteristics when a fixed point on the record medium has reached a first predetermined point in its path of movement, transmitting said first transient signal to said recorder whereby an excursion in said trace representative thereof is recorded, initiating a second operating cycle of said recording device, detecting said trace and transducing said excursion into a playback electrical signal, passing said playback signal through said electronic system, generating a second transient signal of said known characteristics when said fixed point on the record medium has reached a second predetermined point in its path of movement spaced from said first point a distance representative of said time delay, mixing said playback signal and said second transient signal to form a composite signal, and feeding said composite signal to said recorder.

3. A method for testing for proper composition of two repetitive electrical signals of unknown characteristics wherein one of said signals has a time delay imposed thereon by an electronic system, said method comprising the steps of initiating an operating cycle of a recording device, said recording device including a record medium moving during said operating cycle at a constant velocity and a recorded operatively associated therewith to impress thereon a record trace the length of which is representative of time, generating a first transient electrical signal when a fixed point on the record medium has reached a first predetermined point in its path of movement, said first transient signal being a composite signal of multiple frequencies in predetermined phase relationship, transmitting said first transient signal to said recorded whereby an excursion in said trace representative thereof is recorded, initiating a second operating cycle of said recording device, detecting said trace and transducing said excursion into a playback electrical signal, passing said playback signal through said electronic system, generating a second transient signal when said fixed point on the record medium has reached a second predetermined point in the path of movement spaced from said first point a distance representative of said time delay, said second transient signal being of the same multiple frequencies in the same phase relationship as said first transient signal, mixing said playback signal and said second transient signal to form a composite signal, feeding said composite signal to said recorder, and aligning the recorded excursions of said composite signal and said first transient signal as a means to compare said excursions for proportionality.

4. A method for testing for proper composition of two repetitive electrical signals of unknown characteristics wherein one of said signals has a time delay imposed thereon by an electronic system, said method comprising the steps of initiating an operating cycle of a recording device, said recording device including a record drum rotating during said operating cycle at a constant velocity and a recorder operatively associated therewith to impress thereon a record trace the length of which is representative of time, generating a first transient electrical signal of known characteristics when a fixed point on said second drum is in a first predetermined angular disposition, transmitting said first transient signal to said recorder whereby an excursion in said trace representative thereof is recorded, initiating a second operating cycle of said recording device, detecting said trace and transducing said excursion into a playback electrical signal, passing said playback signal through said electronic system, generating a second transient signal of said known characteristics when said fixed point on the record drum has reached a second predetermined angular disposition wherein the arcuate length of its displacement from said first predetermined position is representative of said time delay, mixing said playback signal and said second transient signal to form a composite signal, feeding said composite signal to said recorder, and aligning said composite signal and said first transient signal as a means to compare said signals for proportionality.

5. The method defined in claim 4 wherein said first and second transient signals are of the same multiple frequencies in the same predetermined phase relationship.

6. Apparatus for testing for proper composition of two repetitive electrical signals of unknown characteristics wherein one of said signals has a time delay imposed thereon by an electronic system, comprising a recording device including a record drum rotatable at a constant velocity and a recorder, said recorder being operative when said record device is actuated to impress a longitudinal trace around said drum, the length of said trace being indicative of time, transient electrical signal generating means including first and second cooperating elements, said transient signal being generated by relative movement of said first and second elements through the same radial plane, means for rotating said first element in synchronism with said record drum through the plane of said second element, and means for adjusting the initial arcuate distance between said first element and the plane of said second element.

7. Apparatus for testing for proper composition of two repetitive electrical signals of unknown characteristics wherein one of said signals has a time delay imposed thereon by an electronic system, comprising a recording device including a record drum rotatable at a constant velocity and a recorder, said recorder being operative when said record device is actuated to impress a longitudinal trace around said drum, the length of said trace being indicative of time, transient electrical signal generating means including first and second cooperating elements, said transient signal being generated by relative movement of said first and second elements through the same radial plane, means for rotating said first element in synchronism with said record drum through the plane of said second element, and adjusting means for locating said second elements in a predetermined angular disposition.

8. Apparatus for testing for proper composition of two repetitive electrical signals of unknown characteristics wherein one of said signals has a time delay imposed thereon by an electronic system, comprising a recording device including a record drum rotatable at a constant velocity and a recorder, said recorder being operative when said record device is actuated to impress a longitudinal trace around said drum, the length of said trace being indicative of time, transient electrical signal generating means including first and second cooperating elements, said transient signal being generated by relative movement of said first and second elements through the same radial plane, said first element being secured to said drum for rotation therewith through the plane of said second element, and adjusting means for locating said second element in a predetermined angular disposition.

References Cited in the file of this patent
UNITED STATES PATENTS

| | | |
|---|---|---|
| 2,446,479 | Begun | Aug. 3, 1948 |
| 2,683,254 | Anderson | July 6, 1954 |
| 2,730,699 | Gratian | Jan. 10, 1956 |
| 2,767,389 | McCollum | Oct. 16, 1956 |
| 2,806,545 | Schempf | Sept. 17, 1957 |
| 2,837,729 | Houghton et al. | June 3, 1958 |
| 2,916,724 | Peterson | Dec. 8, 1959 |